(12) United States Patent
Munch et al.

(10) Patent No.: US 7,445,073 B2
(45) Date of Patent: Nov. 4, 2008

(54) SENSOR ASSEMBLY INCLUDING A SENSING CHANNEL HAVING A VOID AND AN ASSOCIATED METHOD

(75) Inventors: Carl A. Munch, Troy, MI (US); Michael C. McCarthy, Birmingham, MI (US)

(73) Assignee: TRW Automotive U.S. LLC, Livonia, MI (US)

( * ) Notice: Subject to any disclaimer, the term of this patent is extended or adjusted under 35 U.S.C. 154(b) by 160 days.

(21) Appl. No.: 11/056,583

(22) Filed: Feb. 11, 2005

(65) Prior Publication Data
US 2006/0180380 A1 Aug. 17, 2006

(51) Int. Cl.
*B60K 28/14* (2006.01)
(52) U.S. Cl. .................. 180/274; 340/436; 250/227.14; 280/735
(58) Field of Classification Search ................. 280/735; 180/271, 274; 356/227.11; 250/227.14, 250/222.1, 227.11; 385/13; 296/146.6; 293/4; 340/436
See application file for complete search history.

(56) References Cited

U.S. PATENT DOCUMENTS

| 4,346,914 | A | | 8/1982 | Livers et al. |
| 4,466,697 | A | * | 8/1984 | Daniel ......................... 385/123 |
| 4,654,520 | A | * | 3/1987 | Griffiths ................. 250/227.14 |
| 4,675,521 | A | * | 6/1987 | Sugimoto .............. 250/227.14 |
| 4,750,796 | A | | 6/1988 | Shibata et al. |
| 4,808,814 | A | | 2/1989 | Hofer et al. |
| 4,829,174 | A | * | 5/1989 | Booth et al. ................. 250/221 |
| 4,830,461 | A | * | 5/1989 | Ishiharada et al. ............ 385/13 |
| 4,860,586 | A | | 8/1989 | Miers et al. |
| 4,927,232 | A | * | 5/1990 | Griffiths ....................... 385/13 |
| 4,988,862 | A | | 1/1991 | Beltz |
| 4,995,639 | A | | 2/1991 | Breed |
| 5,106,181 | A | * | 4/1992 | Rockwell, III ................. 385/2 |
| 5,142,141 | A | * | 8/1992 | Talat et al. ............. 250/227.15 |
| 5,291,014 | A | | 3/1994 | Brede et al. |
| 5,321,257 | A | * | 6/1994 | Danisch ................. 250/227.16 |
| 5,335,749 | A | | 8/1994 | Taguchi et al. |
| 5,502,301 | A | | 3/1996 | Lord |

(Continued)

FOREIGN PATENT DOCUMENTS

DE 92 15 383.6 U1 4/1994

(Continued)

*Primary Examiner*—Christopher Ellis
*Assistant Examiner*—Joseph Rocca
(74) *Attorney, Agent, or Firm*—Tarolli, Sundheim, Covell & Tummino LLP (57) ABSTRACT

A sensor assembly (14) for sensing an impact to a vehicle (10) includes a light source (34) for emitting light and a sensing channel (40) for receiving the emitted light. The sensing channel (40) is configured to deform in response to an impact to the vehicle (10) and includes at least one void (70) with dimensions that vary in response to deformation of the sensing channel (40). A detector (36) senses an intensity of the light propagating through the sensing channel (40) and provides a signal indicative of the sensed intensity. The sensed intensity varies as a function of the dimensions of the at least one void (70). The sensor assembly (14) also includes a controller (94) for analyzing the signal from the detector (36) to determine whether the sensing channel (40) has been deformed and thereby, whether an impact to the vehicle (10) has occurred.

14 Claims, 5 Drawing Sheets

U.S. PATENT DOCUMENTS

| | | | |
|---|---|---|---|
| 5,544,930 A * | 8/1996 | Stedman | 296/146.6 |
| 5,596,671 A * | 1/1997 | Rockwell, III | 385/147 |
| 5,629,681 A | 5/1997 | DuVall et al. | |
| 5,633,494 A * | 5/1997 | Danisch | 250/227.16 |
| 5,680,909 A | 10/1997 | Lofy | |
| 5,745,045 A * | 4/1998 | Kulha et al. | 340/5.2 |
| 5,826,903 A * | 10/1998 | Schiller et al. | 280/735 |
| 5,955,854 A | 9/1999 | Zhang et al. | |
| 6,342,948 B1 * | 1/2002 | Gilby | 356/436 |
| 6,470,801 B1 | 10/2002 | Swart et al. | |
| 6,557,889 B2 | 5/2003 | Breed | |
| 6,607,212 B1 | 8/2003 | Reimer et al. | |
| 6,810,135 B1 * | 10/2004 | Berenz et al. | 382/118 |
| 6,902,025 B2 * | 6/2005 | Spies | 180/274 |
| 7,118,126 B2 * | 10/2006 | Wehner et al. | 280/735 |
| 2001/0028163 A1 | 10/2001 | Breed | |
| 2001/0035636 A1 * | 11/2001 | Adachi | 280/735 |
| 2002/0063008 A1 | 5/2002 | Spies | |
| 2002/0112911 A1 | 8/2002 | Recknagel | |
| 2004/0144587 A1 | 7/2004 | Spies | |

FOREIGN PATENT DOCUMENTS

| | | |
|---|---|---|
| DE | 195 37 383 A1 | 4/1997 |
| WO | WO-95/34085 A1 | 12/1995 |

* cited by examiner

SENSOR ASSEMBLY INCLUDING A SENSING CHANNEL HAVING A VOID AND AN ASSOCIATED METHOD

TECHNICAL FIELD

The present invention relates to a sensor assembly for sensing an impact to a vehicle, and to an associated method. More particularly, the present invention relates to a sensor assembly that is responsive to an intensity of light for determining whether an impact to a vehicle has occurred, and to an associated method.

BACKGROUND OF THE INVENTION

Actuatable vehicle occupant protection systems are well known in the art. Such protection systems include one or more vehicle crash sensors for detecting the occurrence of a vehicle crash condition. When a vehicle crash condition is detected, the protection system may actuate an inflatable device, such as an air bag, for helping to protect an occupant of the vehicle.

Known vehicle crash sensors include mechanical devices, such as switches, that close in response to deformation of the vehicle. The closure of the mechanical device indicates the occurrence of a vehicle crash condition. Other known vehicle crash sensors are electrical devices, such as an accelerometer. When a processed output of the electrical device crosses a threshold level, a vehicle crash condition is determined.

Vehicle crash sensors for detecting a side impact to a vehicle must have particularly rapid response times as the time period for actuating an inflatable device for the protection of the occupant during a side impact is significantly less than the time period for actuating an inflatable device for the protection of the occupant during a front impact. To help improve the response time of a vehicle crash sensor for sensing side impacts, it is common to locate the vehicle crash sensor at the side of the vehicle, such as on a side pillar or within the door of the vehicle.

Some difficulties arise when the vehicle crash sensor is located within the door of the vehicle. For example, the vehicle crash sensor must be able to sense a side impact, but must be immune to actions such as door slams. Also, a vehicle crash sensor within the door must be immune to low force impacts to the door such as those common when a door is opened into an object.

SUMMARY OF THE INVENTION

The present invention relates to a sensor assembly for sensing an impact to a vehicle. The sensor assembly comprises a light source for emitting light and a sensing channel for receiving the emitted light. The sensing channel is configured to deform in response to an impact to the vehicle. The sensing channel includes at least one void with dimensions that vary in response to deformation of the sensing channel. The sensor assembly also includes a detector for sensing an intensity of the light propagating through the sensing channel and for providing a signal indicative of the sensed intensity. The sensed intensity varies as a function of the dimensions of the at least one void. The sensor assembly further includes a controller for analyzing the signal from the detector to determine whether the sensing channel has been deformed and thereby, whether an impact to the vehicle has occurred.

In accordance with another aspect, the present invention relates to a method for sensing an impact to a vehicle. The method comprises the steps of: emitting light; receiving the light in a sensing channel that is configured to deform in response to an impact to the vehicle and that includes at least one void having dimensions that vary in response to deformation of the sensing channel; and sensing an intensity of the light propagating through the sensing channel and providing a signal indicative of the sensed intensity. The sensed intensity varies as a function of the dimensions of the at least one void. The method also comprises the step of analyzing the signal to determine whether the sensing channel has been deformed and thereby, determining whether an impact to the vehicle has occurred.

BRIEF DESCRIPTION OF THE DRAWINGS

The foregoing and other features of the present invention will become apparent to those skilled in the art to which the present invention relates upon reading the following description with reference to the accompanying drawings, in which.

DETAILED DESCRIPTION OF THE INVENTION

Figure 1:
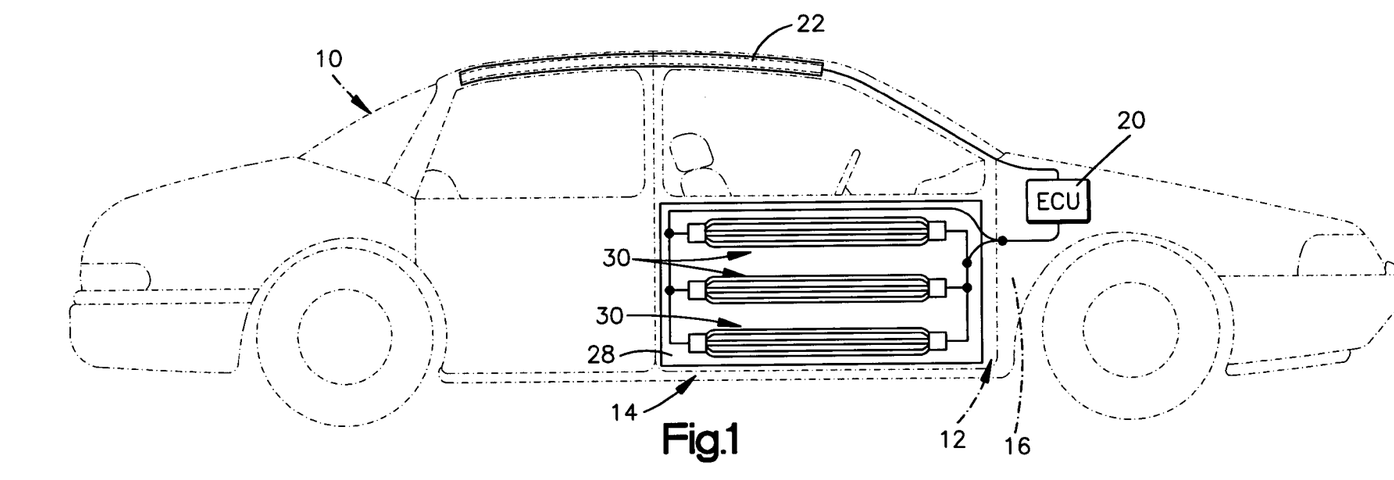
FIG. 1 illustrates a vehicle that includes a sensor assembly constructed in accordance with an exemplary embodiment of the present invention.

FIG. 1 is a side view of a vehicle 10. The vehicle 10 of FIG. 1 includes a door 12 within which a sensor assembly 14 constructed in accordance with the present invention is located. When located within the door 12, the sensor assembly 14 senses side impacts to the vehicle 10. Although the sensor assembly 14 is located within the door 12 in the exemplary embodiment of FIG. 1, the sensor assembly 14 may be located at other locations of the vehicle 12. For example, the sensor assembly 14 may be located within a side panel 16 of the vehicle 10 adjacent the door 12 for sensing a side impact to the vehicle. Alternatively, the sensor 14 may be located at the front of the vehicle 10 for sensing a front impact to the vehicle.

FIG. 1 also illustrates an electronic control unit 20 that is operatively connected to the sensor assembly 14. The electronic control unit 20 may be a microcomputer or any other known controller for controlling actuation of one or more actuatable occupant protection devices. FIG. 1 illustrates a side curtain 22 as an exemplary actuatable occupant protection device. As an alternative to the side curtain 22, the actuatable occupant protection device may include one or more of an inflatable air bag, an inflatable seat belt, an inflatable knee bolster, an inflatable head liner, a knee bolster operated by an inflatable air bag, or any other type of actuatable occupant protection device. When the electronic control unit 20 receives a signal from the sensor assembly 14 indicating the occurrence of an impact to the vehicle 10 for which actuation of the actuatable occupant protection device is desired, the electronic control unit 20 actuates the actuatable occupant protection device, e.g., the side curtain 22, for helping to protect an occupant (not shown) of the vehicle 10.

The sensor assembly 14 illustrated in FIG. 1 is secured within the door 12 at a location adjacent to the outer door skin. As is described below, portions of the sensor assembly 14 are configured to deform as the outer door skin of the door 12 deforms in response to an impact to the vehicle 10. The sensor assembly 14 may be formed on a flexible mat 28 that is secured directly to the outer door skin within the door 12. The mat 28 may be formed from fabric with portions of the sensor assembly 14 adhered to or woven into the fabric. Alternately, the mat 28 may form a sound deadening device of the door 12, with the sensor assembly 14 adhered to a surface of the sound deadening device and positioned adjacent to the outer door skin.

Figure 2:
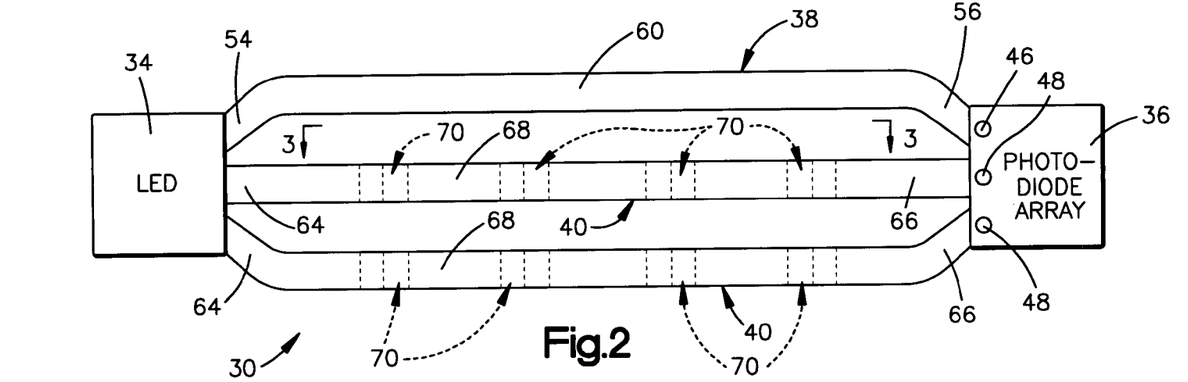
FIG. 2 illustrates a sensing element of the sensor assembly of FIG. 1.

The sensor assembly 14 includes at least one sensor element 30 for sensing an impact to the vehicle 10. The sensor assembly 14 illustrated in FIG. 1 includes three sensor elements 30. The three sensor elements 30 are identical to one another and are spaced apart from one another. FIG. 2 is an enlarged view of one of the sensor elements 30.

With reference to FIG. 2, the sensor element 30 includes a light source 34, a detector 36, a reference channel 38, and two sensing channels 40. Although the sensor element 30 illustrated in FIG. 2 includes two sensing channels 40, the sensor element 30 may include one or more sensing channels 40. The light source 34 of FIG. 2 is a light emitting diode that is actuatable for emitting light. In an exemplary embodiment, the light emitting diode 34 is configured for emitting infrared light.

The detector 36 of FIG. 2 is a photodiode array. The photodiode array 36 includes three photodiodes. The three photodiodes include one reference channel photodiode 46 and two sensing channel photodiodes 48. Each of the photodiodes 46 and 48 is configured to sense an intensity of light and to provide signals indicative of the sensed intensity of light. For example, each photodiode 46 and 48 may output a signal having a voltage that is indicative of the sensed intensity of the light received by that photodiode. Alternatively, the detector 36 may be made up of separate portions, with each portion being associated with a respective channel of the sensor element 30. For example, the detector 36 may be formed from three separate photodiodes, with one photodiode associated with the reference channel 38 and the other two photodiodes associated with the sensing channels 40.

As a further alternative, the sensor element 30 may have multiple emitters or light sources and a common detector. The multiple light sources may emit light having different wavelengths or different frequencies. The common detector may be controlled to monitor for the light emitted from each of the light sources. In one example, the detector may be operated to monitor for the light emitted from each light source for a given period of time at predetermined intervals. In such an example, the detector would cycle between the various wavelengths or frequencies of the emitted light.

The reference channel 38 is an elongated waveguide that extends between the light emitting diode 34 and the reference channel photodiode 46 of the photodiode array 36. A first end 54 of the reference channel 38 receives light from the light emitting diode 34. A second end 56 of the reference channel 38 is connected to the reference channel photodiode 46 of the photodiode array 36. The light emitted from the light emitting diode 34 enters the reference channel 38 and propagates through the reference channel to the reference channel photodiode 46. The reference channel photodiode 46 senses an intensity of the light propagating through the reference channel 38 and provides a reference channel signal indicative of the sensed intensity.

In the embodiment illustrated in FIG. 2, the reference channel 38 is a fiber optic cable that includes a core (not shown) that is surrounded by a cladding 60. Light moves through fiber optic cable according to a principal known as total internal reflection. According to this principle, light entering the core of the fiber optic cable cannot escape when the angle of incidence exceeds a critical value. The cladding 60 has a lower refractive index than the core. As a result, light rays that encounter the cladding 60 at an angle of incidence exceeding the critical value are reflected back into the core so that a high percentage of the light entering the first end 54 of the fiber optic cable of the reference channel 38 propagates through the reference channel and exits the second end 56.

The sensing channels 40 are also elongated waveguides. The two sensing channels 40 of the sensing element 30 of FIG. 2 are identical to one another. Each sensing channel 40 extends between the light emitting diode 34 and an associated sensing channel photodiode 48 of the photodiode array 36. A first end 64 of each of the sensing channels 40 receives light from the light emitting diode 34. A second end 66 of each of the sensing channels 40 is connected to its associated sensing channel photodiode 48. The light emitted from the light emitting diode 34 enters the sensing channels 40 and much of the light propagates through the respective sensing channel to the associated sensing channel photodiode 48. The sensing channel photodiode 46 senses an intensity of the light propagating through the respective sensing channel 40 and provides a signal indicative of the sensed intensity.

In the embodiment illustrated in FIG. 2, the sensing channels 40 are also fiber optic cables that include a core (not shown) that is surrounded by a cladding 68. The cladding 68 has a lower refractive index than the core. As a result, light rays that encounter the cladding 68 at an angle of incidence exceeding the critical value are reflected back into the core.

Figure 3:
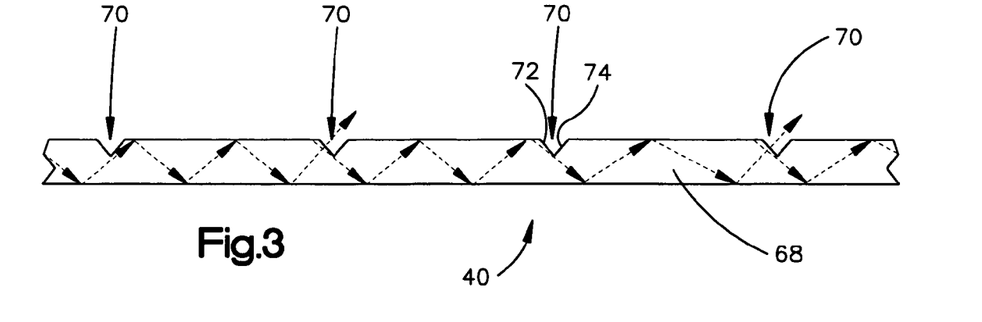
FIG. 3 illustrates a portion of a sensing channel of the sensing element of FIG. 2, with the sensing channel in a non-deformed condition.

FIG. 3 is a plan view of one of the sensing channels 40 of FIG. 2. As is shown in FIG. 3, multiple voids 70 are present in the sensing channel 40. Each sensing channel 40 includes at least one void 70. The sensing channel 40 of FIGS. 2 and 3 includes four voids 70. When the sensing channel 40 is fiber optic cable, the voids 70 extend completely through the cladding 68 and may optionally remove a portion of the core of the fiber optic cable.

The voids 70 illustrated in FIG. 3 are formed from V-shaped cutouts. The voids 70, however, may have any shape. Each of the voids 70 in FIG. 3 is defined by two surfaces 72 and 74, as is illustrated with respect to one void 70 in FIG. 3. The voids 70 of FIG. 3 extend partially into the core of the fiber optic cable of the sensing channel 40.

Light also moves through the fiber optic cable of the sensing channel 40 according to the principal known as total internal reflection. FIG. 3 schematically illustrates light rays, shown by dashed arrows in FIGS. 3 and 4, propagating through the sensing channel 40. According to the principal of total internal reflection, when the light rays encounter the cladding 68 at an angle of incidence exceeding the critical value, the light rays are reflected back into the core so that the light rays pass through the fiber optic cable. When a light ray encounters a surface 72 defining a void 70, the angle of incidence of the light ray likely is less than the critical value. As a result, the light ray exits the fiber optic cable of the sensing channel 40 through the surface 72. FIG. 3 illustrates light rays exiting the sensing channel 40 through the surfaces 72 of two of the voids 70.

Figure 4:
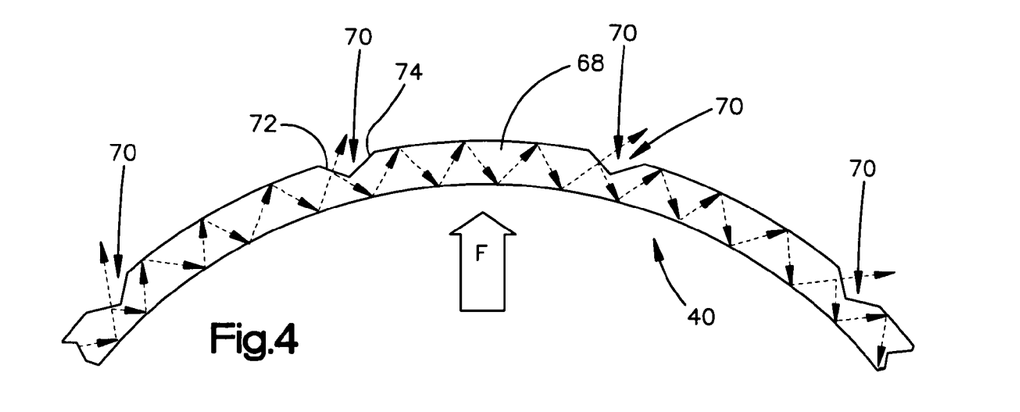
FIG. 4 illustrates the portion of a sensing channel of the sensing element of FIG. 2, with the sensing channel in a deformed condition.

The voids 70 of the sensing channel 40 have dimensions that vary in response to deformation of the sensing channel 40. For example, when the sensing channel 40 is deformed in the manner illustrated in FIG. 4, the dimensions of the voids 70 increase. As a result, light rays are more likely to encounter a surface 72 defining a void 70 at an angle of incidence of the light ray that is less than the critical value. As a result, the amount of light that exits the fiber optic cable of the sensing channel 40 through the voids 70 increases and the amount of light that propagates through the sensing element 40 and is sensed by the associated sensing channel photodiode 48 decreases. FIG. 4 schematically illustrates more light exiting the sensing channel 40 that is shown in FIG. 3.

Figure 5:
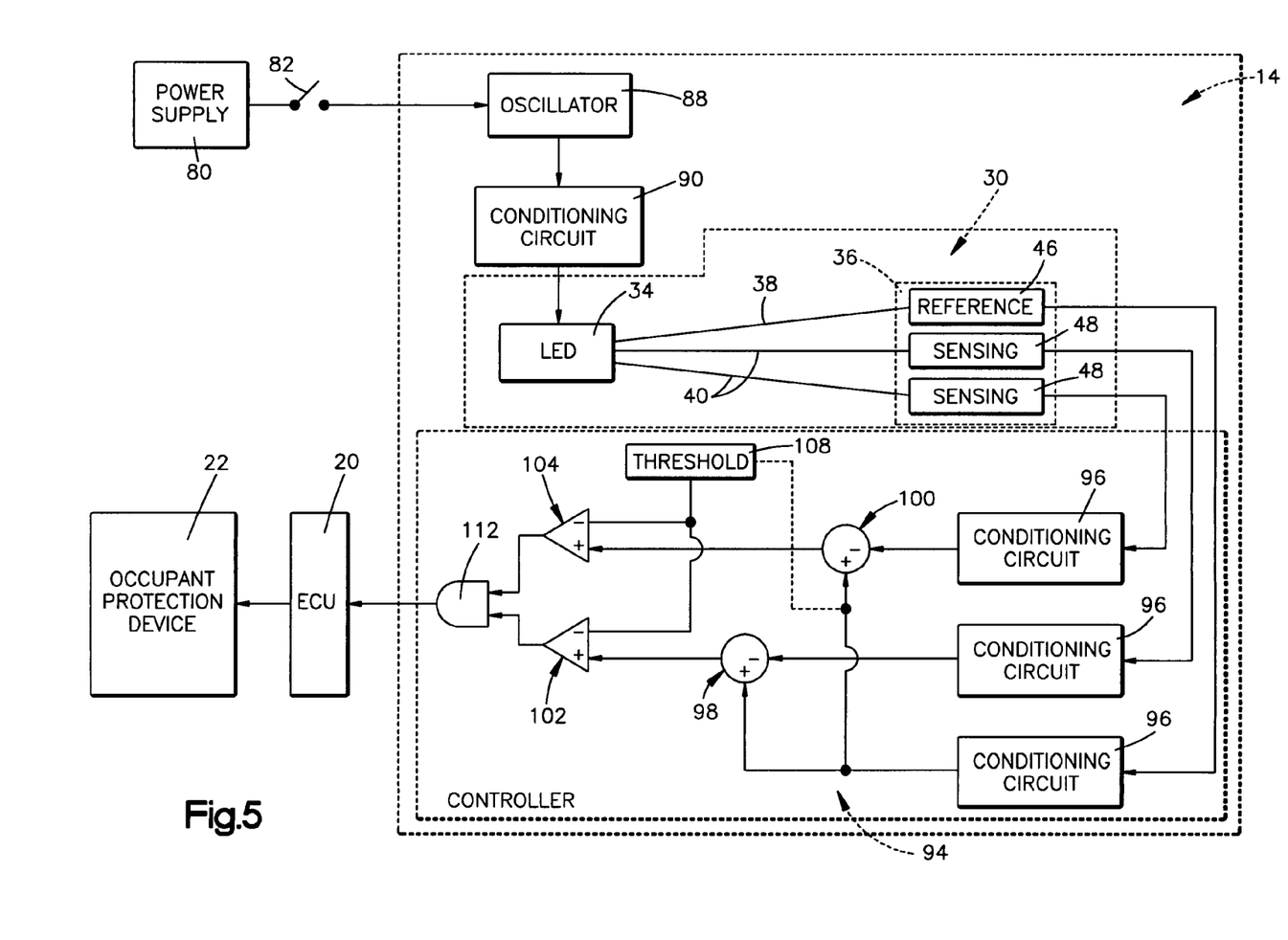
FIG. 5 is a schematic block diagram of a system including a sensor assembly having the sensing element of FIG. 2.

As shown schematically in FIG. 5, a power supply 80, such as the vehicle battery, is associated with the sensor assembly 14. A switch 82 is interposed between the power supply 80 and the sensor assembly 14. When the switch 82 is closed, the sensor assembly 14 receives power from the power source. The switch 82 may be the ignition switch of the vehicle 10.

The power supplied to the sensor assembly 14 is a regulated direct current. An oscillator 88 of the sensor assembly 14 is responsive to the power from the power supply 80 for outputting an alternating current. The alternating current is passed through a conditioning circuit 90, which includes filters and other signal conditioning elements, and is applied to the light emitting diode 34.

The light emitting diode 34 is responsive to the alternating current for emitting pulses of light. The pulses of light are directed into the reference channel 38 and the sensing channels 40 of the sensor element 30. The reference channel photodiode 46 and the sensing channel photodiodes 48 sense the intensity of the light that propagates through the reference channel 38 and the sensing channels 40, respectively. The reference channel photodiode 46 outputs a reference channel signal indicative of the sensed intensity of light propagating through the reference channel 38. Similarly, each of the sensing channel photodiodes 48 outputs a sensing channel signal indicative of the sensed intensity of light propagating through its associated sensing channel 40.

The reference channel signal and the two sensing channel signals are input into a controller 94 of the sensor assembly 14. The controller 94 may be a microcomputer, an application specific integrated circuit (ASIC), or may be formed from discrete circuitry. The controller 94 may be a dedicated controller or, alternatively, may form a portion of the electronic control unit 20.

FIG. 5 schematically illustrates a controller 94 that includes signal conditioning circuits 96 for each of the incoming signals. The signal conditioning circuits 96 include filters and other signal conditioning elements for eliminating noise from the incoming signals. The controller 94 also includes two detector functions 98 and 100 and two impact determination functions 102 and 104. The number of detector functions and impact determination functions is equal to the number of sensing channels 40 of the sensor element 30. Although shown as discrete functions in FIG. 5, the first and second detector functions 98 and 100 and the impact determination functions 102 and 104 may be performed by software of the controller 94.

The detector functions 98 and 100 of the controller 94 are schematically illustrated as summing functions. The detector function 98 receives the reference channel signal output from the reference channel photodiode 46 and the sensing channel signal output from one of the sensing channel photodiodes 48. Similarly, the detector function 100 receives the reference channel signal output from the reference channel photodiode 46 and the sensing channel signal output from the other sensing channel photodiodes 48. In an exemplary embodiment of the invention, the detector functions 98 and 100 subtract the received sensing channel signal from the received reference channel signal and provide a difference signal to the impact determination functions 102 and 104, respectively, of the controller 94.

Each of the impact determination functions 102 and 104 of the controller 94 is operable for analyzing the received difference signal to determine whether an impact to the vehicle 10 has occurred. In an exemplary embodiment of the invention, each of the impact determination functions 102 and 104 is a comparator that compares the received difference signal to a threshold 108. When the difference signal is greater than the threshold 108, the respective impact determination function 102 or 104 determines that an impact to the vehicle 10 has occurred. In response to determining that an impact to the vehicle 10 has occurred, the respective impact determination function 102 or 104 outputs an impact determination signal.

The threshold 108 that is compared to the difference signal in the impact determination functions 102 and 104 may be a fixed threshold or may be a varying threshold. For example, the threshold 108 may vary as a function of a reference channel signal received from the reference channel photodiode 46. A connection between the reference channel photodiode 46 and the threshold 108 is shown by dashed lines in FIG. 5. In one embodiment of the invention, the threshold 108 is a predetermined percentage of the reference channel signal.

As a further alternative to the impact determination functions 102 and 104 being comparators for comparing the difference signal to a threshold, the impact determination functions 102 and 104 may include a memory (not shown) in which a look-up table is stored. The look-up table may, for example, correlate the difference signal to the severity of an impact to the vehicle 10. The impact determination functions 102 and 104 may be responsive to the received difference signal for providing impact determination signals to the electronic control unit 20 that are indicative of the severity of the impact to the vehicle 10. The electronic control unit 20 is responsive to the impact determination signal for controlling actuation of the occupant protection device, e.g., the side curtain 22.

The reference channel 38 of the sensor element 30 enables the sensor assembly 14 of the present invention to distinguish actual impacts to the vehicle 10 from signal changes that occur independently of deformation of a sensing channel 40 of the sensor element 30. For example, variations in electrical energy supplied to the light emitting diode 34 may result in similar variations in the intensity of the light sensed by the sensing channel photodiodes 48. Additionally, the intensity of the light emitted from the light emitting diode 34 may change over time or due to changes in temperature. As a result, if an impact determination was determined solely from the sensing channel signals from the sensing channel photodiodes 48, an improper impact determination may occur. By providing the reference channel 38 and determining a difference between the reference channel signal from the reference channel photodiode 46 and the sensing channel signal from the sensing channel photodiode 48, variations in electrical energy that may affect the intensity of the light emitted by the light emitting diode 34 are compensated for and will not result in the occurrence of an improper impact determination.

When a sensing channel 40 of the sensor element 30 of the sensor assembly 14 is in a non-deformed condition, as shown in FIG. 3, a first amount of the light emitted from the light emitting diode 34 propagates through the sensing channel 40. The sensing channel photodiode 48 that is associated with the sensing channel 40 senses the intensity of the light that has propagated through the sensing channel and provides a sensing channel signal to the associated detector function 98 or 100 of the controller 94. At the same time, the reference channel photodiode 46 senses the intensity of the light propagating through the reference channel 38 and provides a reference channel signal to the same detector function 98 or 100 of the controller 94. When a sensing channel 40 is in a non-deformed condition, the intensity of the light propagating through the sensing channel 38 will be lower than the intensity of light propagating through the reference channel. In one example, the intensity of the light propagating through the sensing channel 38 is between ten and twenty percent lower than the intensity of light propagating through the reference channel. As a result, a difference signal, which is determined by subtracting the sensing channel signal from the reference channel signal, will be lower than the threshold 108 and the association impact determination function 102 or 104 will provide an impact determination signal indicating that no impact has occurred.

Upon the occurrence of an impact to the side of the vehicle 10, for example, into the door 12, a force F (FIG. 3) is applied to the sensing channel 40 and the sensing channel deforms. FIG. 3 illustrates the force F being localized near a center of the sensing channel 40. As a result, the center of the sensing channel 40 moves relative to the first and second ends 64 and 66 (FIG. 2) of the sensing channel and the sensing channel deforms into the configuration illustrated in FIG. 4.

When the sensing channel 40 deforms into the configuration illustrated in FIG. 4, the dimensions of the voids 70 in the sensing channel 40 are increased and the likelihood of light rays encountering a surface 72 defining a void 70 at an angle of incidence that is less than the critical value increases. As a result, more light rays exit the fiber optic cable of the sensing channel 40 and the intensity of the light sensed by the associated sensing channel photodiode 48 decreases relative to that sensed when the sensing channel is not deformed, as shown in FIG. 3. When the sensing channel signal provided by the associated sensing channel photodiode 48 is subtracted from the reference channel signal, the resulting difference signal will likely exceed the threshold 108. When the difference signal exceeds the threshold 108, the associated impact determination function 102 or 104 outputs an impact determination signal indicating that an impact to the vehicle has occurred.

To help prevent the electronic control unit 20 from actuating the occupant protection device 22 in response to a localized impact, such as may occur, for example, when the door 12 is opened into an object, the controller 94 may also include an AND function 112. The AND function 112 is responsive to the impact determination signals output from the two impact determining functions 102 and 104 for providing a sensor signal to the electronic control unit 20. The AND function 112 is configured to provide the electronic control unit 20 with a sensor signal indicating that an impact to the vehicle 10 has occurred for which actuation of the occupant protection device 22 may be desired only when both of the impact determining signals from the impact determining functions 102 and 104 indicate the occurrence of an impact. An indication of an impact from only one of the impact determining functions 102 and 104 indicates a localized impact to the vehicle 10, such as the door being opened into an object. When both of the impact determining functions 102 and 104 indicate the occurrence of an impact, the impact affects a greater area of the vehicle 10 and is more likely to be an impact for which actuation of the occupant protection device 22 is desired.

It is recognized that an impact to the vehicle 10 may also deform the reference channel 38 of the sensor element 30. The reduction in the intensity of light propagating through the reference channel 38 due to deformation of the reference channel, however, is relatively insignificant compared to the reduction in the intensity of the light propagating through the sensing channels 40 when deformed. As a result, when both the reference channel 38 and a sensing channel 40 are deformed, the difference signal output from the associated detector function 98 or 100 will likely exceed the threshold 108 so that the associated impact determination function 102 or 104 will properly sense the impact to the vehicle 10.

As a further precaution to prevent improper actuation of the occupant protection device 22, the electronic control unit 20 may include a feature that requires the sensor signal from the controller 94 to indicate an impact to the vehicle 10 for a predetermined period of time.

Figure 6:
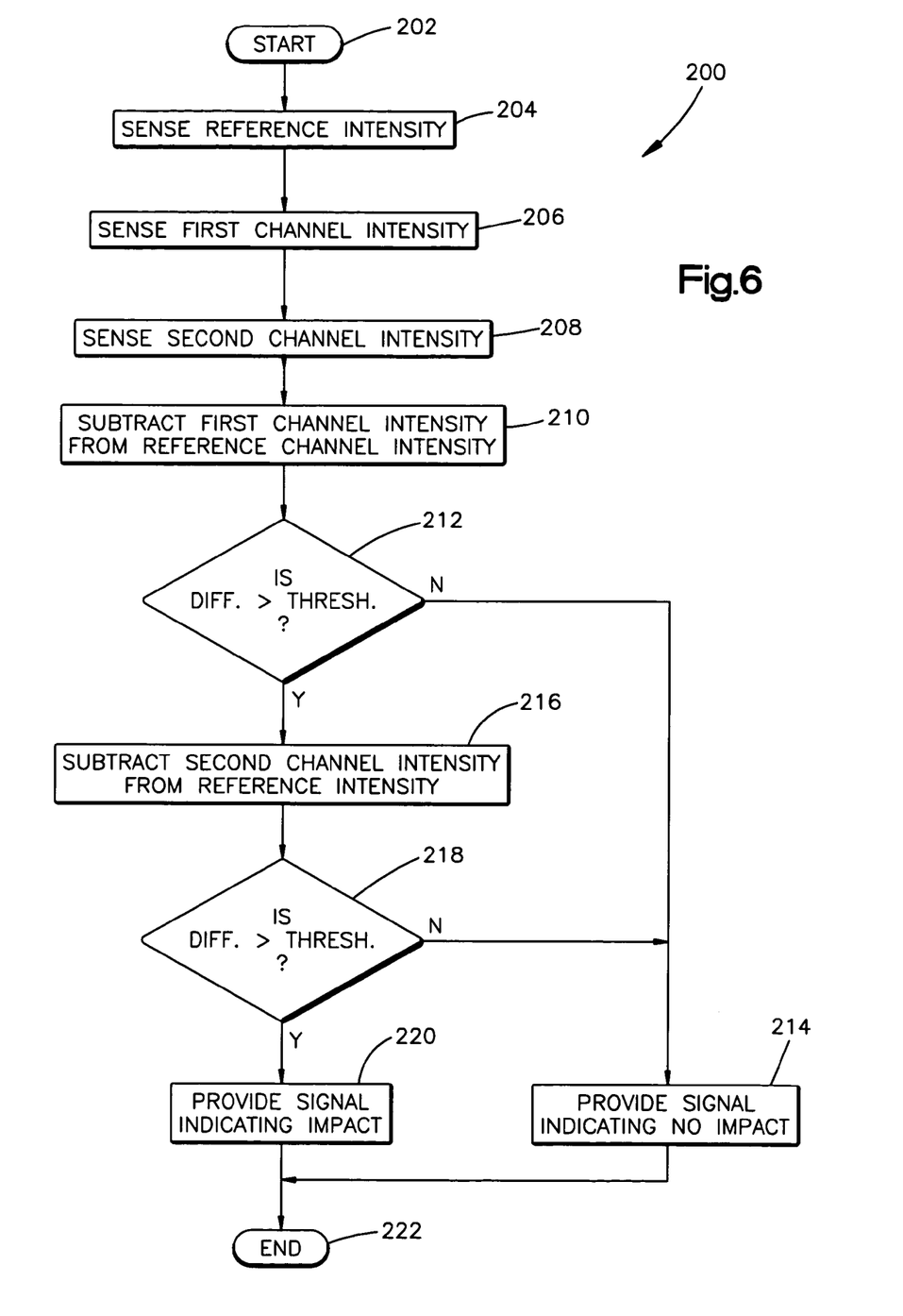
FIG. 6 is a flow diagram of an exemplary process performed by a sensor assembly constructed in accordance with the present invention.

FIG. 6 is a flow diagram of an exemplary process 200 performed by a sensor assembly 14 constructed in accordance with the present invention. The process 200 begins at step 202 in response to the sensor assembly 14 being activated. The sensor 14 may be activated, for example, when the ignition switch 82 (FIG. 5) of the vehicle 10 is closed.

At step 204, a reference intensity that is indicative of the light propagating through a reference channel, such as reference channel 38 of FIG. 2, is sensed. At step 206, a first sensing channel intensity that is indicative of the light propagating through a first sensing channel, such as a first one of the sensing channels 40 of FIG. 2, is sensed. At step 208, a second sensing channel intensity that is indicative of the light propagating through a second sensing channel, such as a second one of the sensing channels 40 of FIG. 2, is sensed.

From step 208, the process 200 proceeds to step 210. At step 210, a difference value is determined by subtracting the sensed first sensing channel intensity of step 206 from the sensed reference intensity of step 204. At step 212, a determination is made as to whether the determined difference value is greater than a threshold. When the determination at step 212 is negative and the determined difference value is not greater than the threshold, the process 200 proceeds to step 214 in which the sensor assembly 14 outputs an indication that no impact has occurred. When the determination at step 212 is affirmative and the determined difference value is greater than the threshold, the process 200 proceeds to step 216.

At step 216, a difference value is determined by subtracting the sensed second sensing channel intensity of step 208 from the sensed reference intensity of step 204. At step 218, a determination is made as to whether the determined difference value is greater than a threshold. When the determination at step 218 is negative and the determined difference value is not greater than the threshold, the process 200 proceeds to step 214 in which the sensor assembly 14 outputs an indication that no impact has occurred. When the determination at step 218 is affirmative and the determined difference value is greater than the threshold, the process 200 proceeds to step 220. At step 220, the sensor assembly 14 outputs an indication that an impact has occurred. From steps 214 and 220, the process 200 proceeds to step 222. At step 222, the process ends.

Figure 7A:
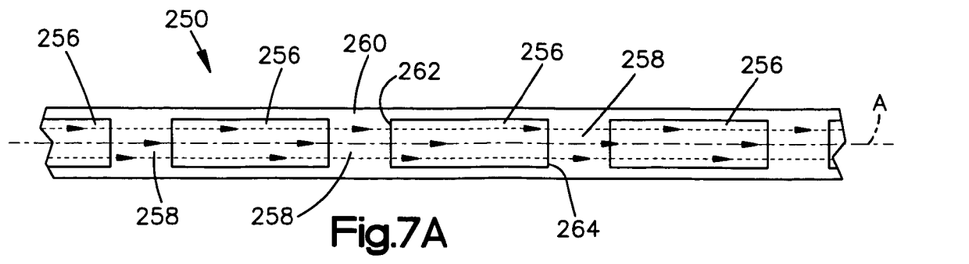
FIG. 7A illustrates a portion of an alternative sensing channel in a non-deformed condition.
Figure 7B:
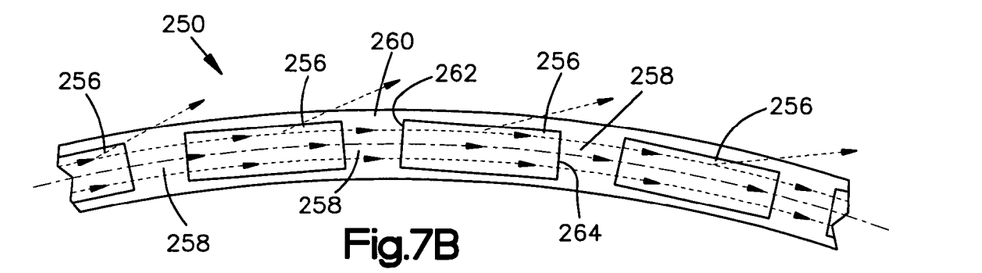
FIG. 7B illustrates the portion of the alternative sensing channel in a deformed condition.

FIGS. 7A and 7B illustrate a portion of an alternative sensing channel 250 for use in a sensing element 30 of the sensing assembly 14 of the present invention. FIG. 7A illustrates the portion of the sensing channel 250 in a non-deformed condition and FIG. 7B illustrates the portion of the sensing channel 250 in a deformed condition.

The sensing channel 250 is formed from a plurality of focusing elements 256. Voids 258 separate adjacent focusing elements 256 from one another. A translucent sheath 260 supports the focusing elements 256 relative to one another. The focusing elements 256 tend to focus light rays along a longitudinal axis, shown as axis A in FIG. 7A. Thus, light rays that enter a first end 262 of a focusing element 256 tend to exit a second end 260 in a direction generally parallel to axis A.

When the sensing channel 250 is in the non-deformed condition, shown in FIG. 7A, a substantial amount of the light rays that enter the sensing element 250 propagate through the sensing element to be sensed by an associated detector. When an impact to the vehicle occurs, the sensing channel 250 is deformed. When the sensing channel 250 is deformed, the dimensions of the voids 258 increase and an increased loss occurs in the transfer of light waves between adjacent focusing elements 256. FIG. 7B schematically illustrates the increased loss by illustrating light rays exiting the sensing channel 250. The increased loss results in less light propagating through the sensing channel 250 and a lower intensity of light being sensed by the associated detector. As set forth above, the sensing assembly 14 determines the occurrence of an impact to the vehicle from the sensed intensity of the light propagating through the sensing channel 250.

Figure 8A:
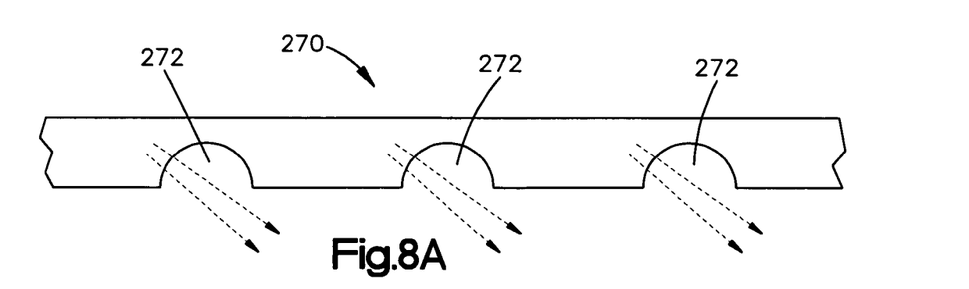
FIG. 8A illustrates a portion of a second alternative sensing channel in a non-deformed condition.
Figure 8B:
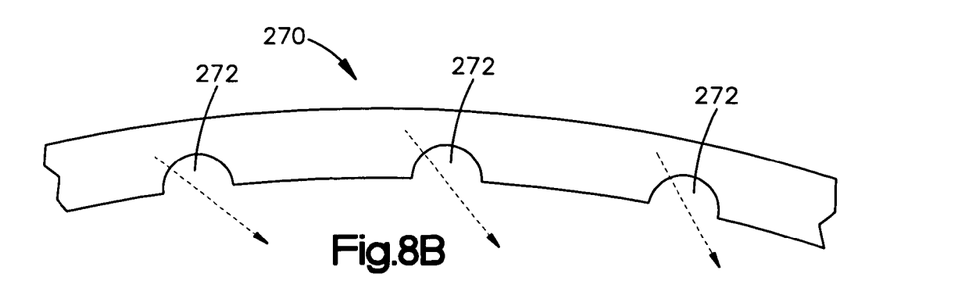
FIG. 8B illustrates the portion of the second alternative sensing channel in a deformed condition.

FIGS. 8A and 8B illustrates a portion of a second alternative sensing channel 270 for use in a sensing element 30 of the sensing assembly 14 of the present invention. FIG. 8A illustrates the portion of the sensing channel 270 in a non-deformed condition and FIG. 8B illustrates the portion of the sensing channel 270 in a deformed condition.

The sensing channel 270 is a fiber optic cable that includes a plurality of voids 272. The voids 272 are semi-circular cutouts that are located on a side of the sensing channel nearest the outer skin of the vehicle. When an impact to the vehicle occurs, the sensing channel 270 deforms. In the deformed condition, the dimensions of the voids 272 decrease, as shown with reference to FIG. 8B.

When the sensing channel 270 is in the non-deformed condition, shown in FIG. 8A, a first amount of the light rays that enter the sensing element 270 exits the sensing element through the voids 272. When an impact to the vehicle occurs and the sensing channel 270 is deformed, as shown by FIG. 8B, a second, lower amount of the light rays exits the sensing element through the voids 272. FIG. 8B schematically illustrates fewer light rays exiting the sensing channel 270 than is shown in FIG. 8A. As a result, when the sensing channel 270 is deformed, a greater amount of the light propagates through the sensing channel 270 and a higher intensity of light is sensed by the associated detector.

As set forth above, the sensing assembly 14 determines the occurrence of an impact to the vehicle from the sensed intensity of the light propagating through the sensing channel 270. Since the intensity of light propagating through the sensing channel 270 increases when the sensing channel is deformed, the impact determining function of the controller 94 of the sensor assembly 14 may subtract the reference channel intensity from the sensing channel intensity for comparison to a threshold for determining whether an impact to the vehicle has occurred.

From the above description of the invention, those skilled in the art will perceive improvements, changes and modifications. For example, the channels 38 and 40 of the sensor elements 30 need not extend linearly between the light source 34 and the detector 36. The channels 38 and 40 may have a curved or serpentine path between the light source 34 and the detector 36. Additionally, when multiple sensor elements 30 are present in a sensor assembly 14, one sensor element may be used as a discrimination sensor and another sensor element may be used as a safing sensor. Moreover, in addition to, or as an alternative to, using the data from the sensor assembly 14 for actuating an actuatable occupant protection device, such as a side curtain 22, the data may be used to classify various types of crash conditions. For example, the data from the sensor assembly 14 may be used to determine if a crash is a pole or a barrier crash. Also, the data from the sensor assembly 14 may be used for determining when an offset or angular vehicle crash occurs. Such improvements, changes and modifications within the skill of the art are intended to be covered by the appended claims.

Having described the invention, we claim the following:

1. A sensor assembly for sensing an impact to a vehicle, the sensor assembly comprising:
   a light source for emitting light;
   a sensing channel for receiving and propagating the emitted light, the sensing channel configured to deform in response to an impact to the vehicle and including at least one void with dimensions that vary in response to deformation of the sensing channel, light propagating through said sensing channel escaping through said at least one void so that propagated light intensity is functionally related to an impact to the vehicle;
   a detector for sensing the intensity of the light propagating through the sensing channel and for providing a signal indicative of the sensed intensity;
   a reference channel also receiving the emitted light;
   a reference detector sensing an intensity of the light propagating through the reference channel and providing a reference signal indicative of the sensed intensity of the light propagating through the reference channel; and
   a controller for analyzing the signal from the detector to determine whether the light intensity is indicative of an impact to the vehicle, the controller using the reference signal for compensating for variations in an intensity of the light emitted from the light source.

2. The sensor assembly of claim 1 wherein the controller determines that an impact to the vehicle has occurred when a difference between the intensity of light propagating through the sensing channel and the intensity of light propagating though the reference channel exceeds a threshold.

3. The sensor assembly of claim 2 wherein the threshold varies as a function of the intensity of light propagating through the reference channel.

4. The sensor assembly of claim 1 wherein the detector for the sensing channel and the reference detector are photodiodes.

5. The sensor assembly of claim 4 wherein the photodiodes form separate portions of a single photodiode array.

6. The sensor assembly of claim 1 wherein the sensing channel is formed on a mat, the mat adapted to be secured relative to the vehicle in a location for sensing an impact to the vehicle.

7. The sensor assembly of claim 1 wherein the sensing channel is a fiber optic cable having a cladding, the at least one void extending completely through the cladding.

8. The sensor assembly of claim 1 wherein the light source is a light emitting diode that is adapted to provide pulses of light.

9. The sensor assembly of claim 1 wherein the dimensions of the at least one void increase in response to deformation of the sensing channel, the sensed intensity of the light decreasing as the dimensions of the at least one void increase.

10. The sensor assembly of claim 1 wherein the dimensions of the at least one void decrease in response to deformation of the sensing channel, the sensed intensity of the light increasing as the dimensions of the at least one void decrease.

11. A method for sensing an impact to a vehicle, the method comprising the steps of:

emitting light;

receiving the light in a sensing channel that is configured to deform in response to an impact to the vehicle;

varying the light intensity in the sensing channel as a function of an impact to the vehicle using at least one void having dimensions that vary in response to deformation of the sensing channel, light escaping through the at least one void;

sensing the intensity of the light propagating through the sensing channel and providing a signal indicative of the sensed intensity;

determining from the signal intensity whether an impact to the vehicle has occurred;

receiving the emitted light in a reference channel;

sensing an intensity of the light propagating through the reference channel and providing a reference signal indicative of the sensed intensity of the light propagating through the reference channel; and using the reference signal to compensate for variations in an intensity of the light emitted from the light source.

12. The method of claim 11 further including the steps of:

determining that an impact to the vehicle has occurred when a difference between the intensity of light propagating through the sensing channel and the intensity of light propagating though the reference channel exceeds a threshold.

13. The method of claim 12 further including the step of varying the threshold as a function of the sensed intensity of light propagating through the reference channel.

14. The method of claim 11 wherein the step of emitting light further includes the step of emitting pulses of light.

* * * * *